United States Patent [19]

Roppel

[11] Patent Number: 5,802,082
[45] Date of Patent: Sep. 1, 1998

[54] METHOD AND DEVICE FOR MEASURING CELL PROPAGATION TIME IN ATM NETWORKS

[75] Inventor: Carsten Roppel, Ronshausen, Germany

[73] Assignee: Deutsche Telekom AG, Bonn, Germany

[21] Appl. No.: 687,239

[22] Filed: Jul. 25, 1996

[30] Foreign Application Priority Data

Jul. 25, 1995 [DE] Germany .................... 195 27 061.4

[51] Int. Cl.$^6$ ...................................................... G06F 11/00
[52] U.S. Cl. ........................................... 371/62; 375/356
[58] Field of Search ................................ 371/61, 62, 57.1, 371/22.1; 370/321, 232, 233, 234, 236; 375/355, 356

[56] References Cited

U.S. PATENT DOCUMENTS

| | | | |
|---|---|---|---|
| 4,849,991 | 7/1989 | Arnold et al. | 375/356 |
| 4,941,155 | 7/1990 | Chuang | 375/344 |
| 4,972,412 | 11/1990 | Satoh | 371/62 |
| 5,450,394 | 9/1995 | Gruber et al. | 370/253 |

FOREIGN PATENT DOCUMENTS 41 28 411 C2 7/1993 Germany .

OTHER PUBLICATIONS

Bakker et al., "Asynchroner Transfer–Modus: Graundbaustein für das Breitband–ISDN, Teil III, Verkehr und Vermittlung," In: Nachrichtentechn., Elektron., Berlin 42, 1992, 4, S. 154–158. (No English translation).

Andexser et al., "U.a.: ATM–Meβtechnik für das Breitband–ISDN," In: ntz, Bd. 46, 1993, H.2, S. 102–104, 106, 108 (No English translation).

Tobiet, Henri, "Modulare Testarchitektur für breitbandige ATM–Netze," In: ntz, Bd. 45, 1992, H. 2, S. 88, 89, 92, 94, 97 (No English translation).

*Primary Examiner*—Robert W. Beausoliel, Jr.
*Assistant Examiner*—Trinh L. Tu
*Attorney, Agent, or Firm*—Kenyon & Kenyon

[57] ABSTRACT

In a process for determining the cell propagation time between two arbitrary test points in an asynchronous network, specifically an ATM network, as well as a device for performing this process, the cell propagation time between two test points using two free-running clocks, i.e., non-synchronized clocks, is determined. For this purpose, a plurality of test cells are transmitted bidirectionally between the two test points and the respective send and receive instants are measured and recorded. With the help of a linear regression analysis of the measured send and receive instants, the time and frequency offsets between the two clocks can be estimated. The cell propagation time is then determined from the estimated frequency offset, the estimated time offset, and the measured send and receive instants of a selected test cell traveling in the upward and/or downward direction.

9 Claims, 3 Drawing Sheets

METHOD AND DEVICE FOR MEASURING CELL PROPAGATION TIME IN ATM NETWORKS

FIELD OF THE INVENTION

The present invention relates to methods and devices for determining the cell propagation time between two test points in an asynchronous network, specifically in an ATM network.

RELATED TECHNOLOGY

In an ATM (Asynchronous Transfer Mode) network, information is transferred in blocks of equal length, also called cells, obtained by the well-known asynchronous time multiplexing method. Each cell comprises a 5-byte header and a 48-byte information field. The time a cell takes to travel from a source point to a target point can vary depending on delays occurring in the transfer media, fixed switching delays in the transfer equipment, and delays in the cell buffers. This time, referred to as cell propagation time, is a critical performance parameter of an asynchronous network and must not exceed a maximum job-specific value. Methods have been devised to measure the cell propagation time between two test points (e.g., transfer points or network nodes).

A method is known where, in order to measure the cell propagation time between two test points (e.g. network nodes), a test cell is provided with a mark for the exact time it was sent (send instant mark) in the information field and introduced in the link to be measured. This cell is received at the target test point, where the exact time of receipt (receive instant) is also recorded. If the clocks of the two test points providing the send and receive instant marks are synchronized, the cell propagation time can be simply obtained by calculating the difference between the receive and send instant marks. Two clocks are deemed synchronized when both the cycling and rest states of each coincide.

It is also known that clocks separated by great distances can be synchronized by receiving and analyzing time codes of the GPS (Global Positioning System) satellite-supported navigation system. For this purpose, however, the network components must be equipped with GPS receivers, which involves considerable costs for the equipment and its maintenance.

SUMMARY OF THE INVENTION

Therefore, an object of the present invention is to provide a process and a means for determining the cell propagation time without needing to synchronize the clocks at the respective test points.

This technical problem is solved by the present invention by providing a process for determining the cell propagation time between two test points in an asynchronous network, specifically in an ATM network, with a clock installed at each test point, characterized by a) bidirectionally transmitting a plurality of cells between the two test points, b) measuring the send instant ($t_{ui}$, $\phi_{di}$) of an outgoing cell (i), c) measuring the receive instant ($\phi_{ui}$, $t_{di}$) of the incoming cell (i), d) repeating steps b) and c) for each cell, e) estimating the frequency offset ($\bar{\alpha}$) between the clocks at both test points from the measured send and receive instants, f) estimating the time offset ($\Delta \bar{T}_o$) between the clocks at both test points from the estimated frequency offset and the send and receive instants of at least one cell, and g) determining the cell propagation time ($\bar{D}_{ui}$, $\bar{D}_{di}$) from the estimated frequency offset and from the measured send and receive instants of the cell (i) for the upward and/or downward direction.

A network is also provided for performing this method, characterized in that the following devices are arranged at a plurality of test points of the asynchronous network: a clock for measuring the send and receive instants of the cells exchanged between two selected test points; at least one buffer for intermediary storage of at least one cell, at least one storage device for storing the measured send and receive instants, and in that an analysis and computing unit, capable of obtaining a frequency offset and a time offset between clocks at the two selected test points from the measured send and receive instants and of determining the cell propagation time in the upward and/or downward directions using the frequency and time offsets obtained, as well as the send and receive instants measured, is provided at least one test point.

According to the present invention, a plurality of test cells are exchanged bidirectionally between two selected test points (which may be any network components). The send instant is measured and possibly stored at the source test point for each outgoing cell. The receive instant is measured and possibly stored for each cell received at the other test point. The send and receive instants are advantageously written as time marks into the information fields of the respective cells to make them available at the corresponding test points in order to determine the cell propagation time. Subsequently, the frequency offset between the clocks at both test points is estimated from the measured send and receive instants. The frequency offset describes the cycle difference between the clock at one test point and the clock at the other test point. Then the time offset between the clocks at both test points is estimated from the previously estimated frequency offset and the send and receive instants of at least one test cell. The time offset describes the state of the clock at one test point in relation to state of the clock at the other test point at the beginning of the cell propagation time measurement. An improved estimated value for the time offset between the two clocks is obtained when at least one value from the measured send and receive instants assigned in pairs to a certain test cell and the frequency offset estimated on their basis are determined, with the value thus determined corresponding to a minimum propagation time between the two test points. Then the time offset is estimated with the help of this value obtained for a minimum propagation time. At least one value is needed for both the upward and downward directions between the two selected test points.

The frequency and time offsets are estimated using a linear regression analysis of the measured send and receive instants using the least squares of the errors method. An analysis and computing device, implemented in at least one network component, determines the cell propagation time from the estimated frequency offset, the estimated time offset, and the measured send and receive instants of the test cells for the upward and downward travel of the test cell.

The cell propagation times for the upward and downward travel of a cell between two selected test points are advantageously calculated using the formula $$\overline{D}_{ui} = \frac{\phi_{ui} - \Delta \overline{T}_0}{1 + \alpha} - t_{ui}$$

and $$\overline{D}_{di} = t_{di} - \frac{\phi_{di} - \Delta \overline{T}_0}{1 + \alpha}$$

respectively.

The cell propagation time can be determined in an especially simple manner by recording the receive instant in the cell arriving at a test point and re-sending the cell basically without delay to the source test point. In this case, all the measured values required for the analysis are available at the source test point. Then the receive instant measured for the incoming cell (transmitted in the upward direction) corresponds to the send instant of the cell transmitted in the downward direction at this test point.

Before transmitting test cells between two selected test points or network components, one of the two test points is selected as the reference test point, and thus the clock assigned to this test point is selected as the reference clock.

BRIEF DESCRIPTION OF THE DRAWINGS

The invention is described in detail below using the embodiment with the attached drawings.

DETAILED DESCRIPTION

Figure 1:
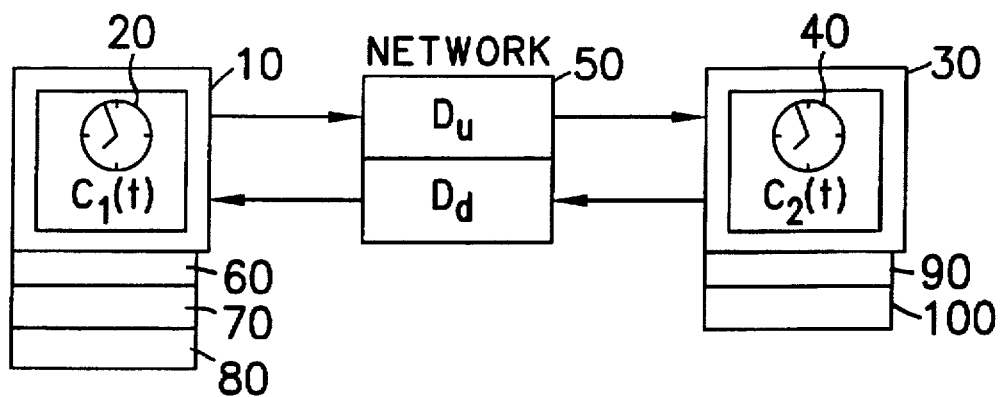
FIG. 1 shows a simplified representation of a network for measuring the cell propagation time between two selected network components.

Two network components 10, 30 of an asynchronous network 50, for example, of an ATM network, are illustrated in FIG. 1. Network components 10, 30 can be intermediary points. Of course, ATM network 50 contains a plurality of such network components 10, 30. A clock 20, 40 is assigned to each intermediary point 10, 30. Clock 20 produces instant $C_1(t)$ and clock 40 provides instant $C_2(t)$. In addition, at each intermediary point 10, 30 there is at least one buffer 60, 90 for the intermediate storage of at least one cell, and at least one storage device 70, 100 for storing the send and/or receive instants provided by clocks 20, 40, which shall be discussed in greater detail below. Furthermore at least at intermediary point 10 there is installed an analysis and computing unit 80, whose operation is described in detail below. For the description that follows, it may be assumed that intermediary point 10 and thus clock 20 are considered reference units. Of course, each intermediary point 10, 30 can have an analysis and computing unit, which, for example, can compute the cell propagation time between intermediary points 10 and 30. The cell propagation time describes in very general terms the delay experienced by a cell when transported between network components, in this case between network components 10 and 30. The cell propagation time between intermediary points, e.g. points 10, 30, is defined as the time $D=t_2-t_1$ between instant $t_1$ when the first bit of an ATM cell has left test point 10 and instant $t_2$ when the last bit of the cell has reached test point 30. The cell propagation time includes delays occurring in the transmission devices, for example network links 50 between the two intermediary points 10, 30, fixed switching delays during transmission, as well as delays occurring in cell buffers. The delay occurring in the transmission devices is basically determined by the finite propagation speed of the signal in the physical medium. In addition, fixed processing times in the transmission devices also affect the cell propagation time. The fixed switching delay of an intermediary point is the minimum delay experienced by a cell when passing through an intermediary point or a node. It is determined, among other things, by the time of polling the translation tables and the propagation times in the transmission equipment. The cell propagation time also takes into consideration the wait time in the cell buffers, which are needed in ATM intermediary points as intermediary buffers for baud rate adjustment and for affecting the traffic volume.

Figure 2:
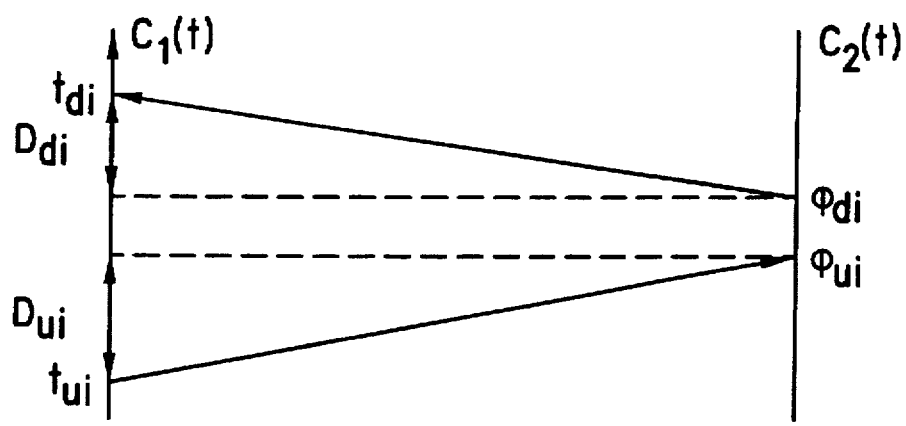
FIG. 2 an exemplary illustration of the relationship between the send and receive instant marks in a distance-time diagram.

In the following, the estimation process according to the present invention for calculating the cell propagation time is described in more detail. Intermediary point 10, selected as a reference point, starts the measuring process by introducing test cells into a stream of data cells at selected instants. These cells are used to measure the send and receive instants as they travel in both upward (i.e., from intermediary point 10 to intermediary point 30) and downward (i.e., from intermediary point 30 to intermediary point 10) directions. The propagation time of a test cell can then be considered as a random sample of the propagation times of the data cells. First, in intermediary point 10, the send instant (send instant mark $t_{ui}$) for a test cell to be transmitted in the upward direction is read from clock 20 and, according to the type of network components 10, 20, stored and/or written into the test cell. On its way to intermediary point 30, this cell experiences a delay, so that it arrives at intermediary point 30 at receive instant $\phi_{ui}$, which is read from clock 40. According to an advantageous embodiment, this receive instant is immediately entered in this cell and the cell is re-sent to intermediary point 10 basically without delay. The processing time of the test cell at intermediary point 30 is negligible. Thus it is ensured that receive instant $\phi_{ui}$, measured for the cell transmitted in the upward direction, is equal to send instant $\phi_{di}$ provided by clock 40 for the cell transmitted in the downward direction. In the downward direction, this test cell experiences another delay, so that it arrives at intermediary point 10 at a receive instant $t_{di}$, provided by clock 20 (see distance-time diagram in FIG. 2). Instead of transmitting the same cells in the upward and downward directions, different cells can also be transmitted in the respective directions in order to obtain the send and receive instants in order to calculate the cell propagation time for the upward and downward directions.

If clocks 20 and 40 at intermediary points 10 and 30 are synchronized, the cell propagation time can be simply obtained by calculating the difference between the receive instant by intermediary point 30 and the send instant by intermediary point 10. The key of the present invention, however, is precisely in obtaining the cell propagation time without synchronizing clocks 20, 40. For this purpose, it is necessary (as explained below), to estimate the relative frequency and time offsets between clocks 20 and 40 with the help of a linear regression analysis of all the measured send and receive instants corresponding to a plurality of test cells.

Figure 3:
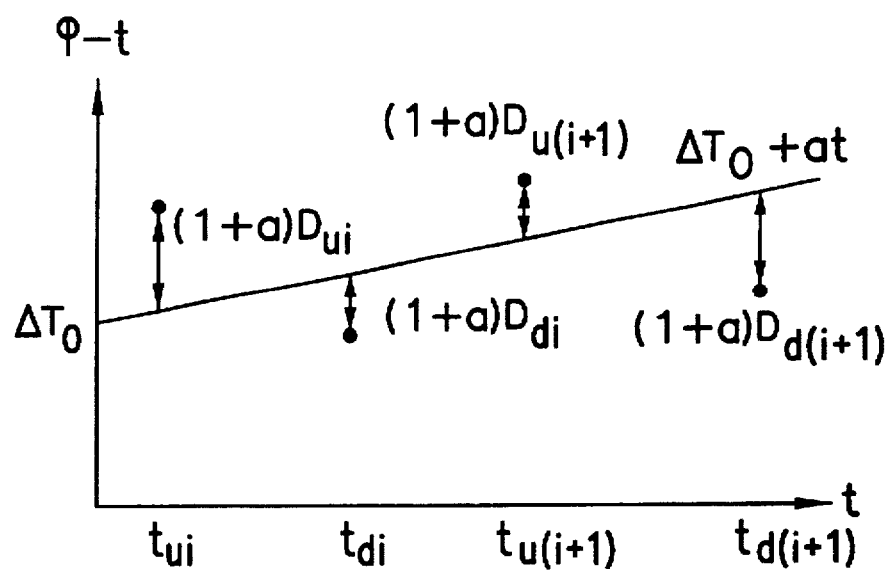
FIG. 3 shows an exemplary graphic representation of the measured instants in a (t, ϕ–t) plane.
Figure 4:
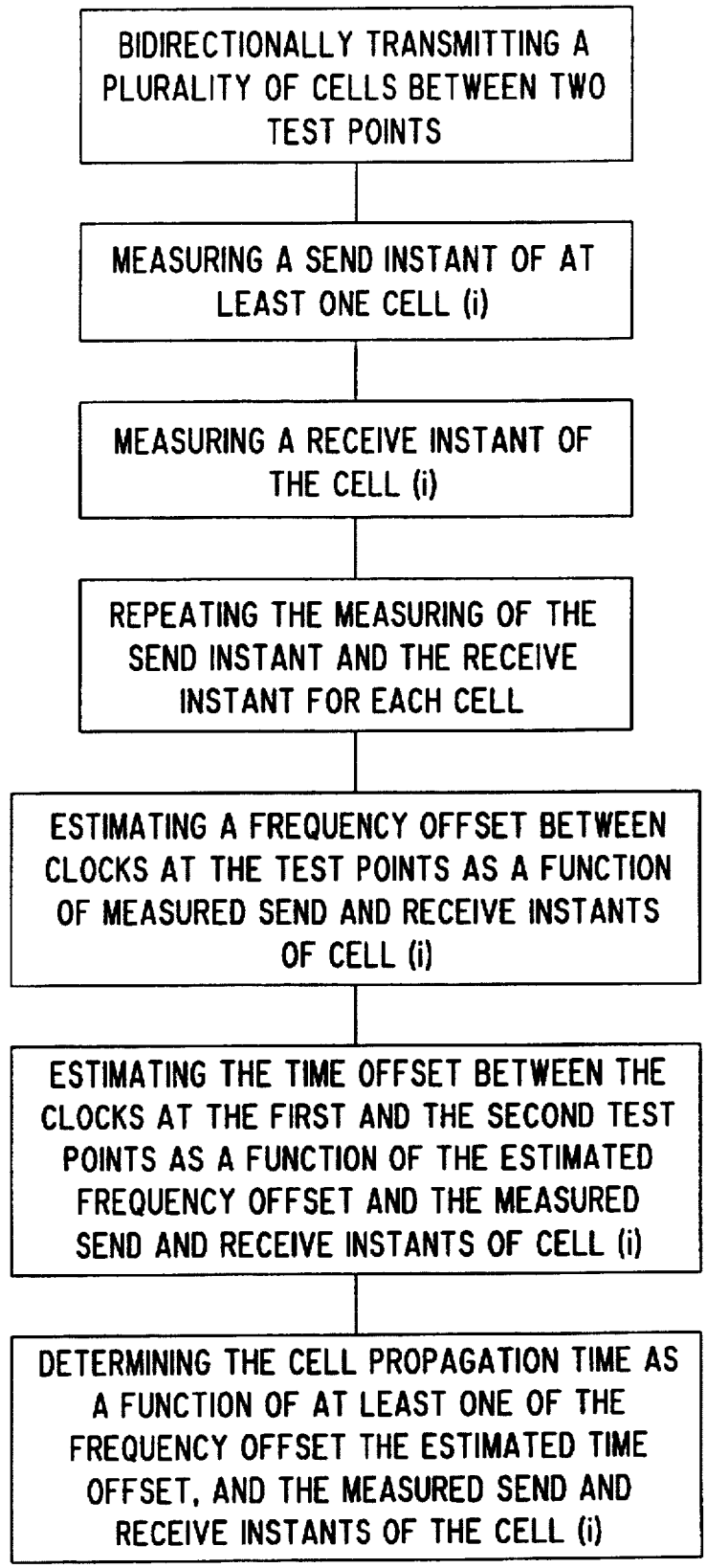
FIG. 4 is a block diagram illustrating steps of the present method.

First, a mathematical model of clock 40, having a time and frequency offset in relation to clock 20 in instant t is provided. The corresponding equation is the following:

$C_2(t) = t + \Delta T_0 + \alpha(t-t_0)$ $\Delta T_0$ is the time offset in instant $t_0$ (i.e., at the beginning of the measurement), and $\alpha$ is the frequency offset of the local oscillator of clock 40. The frequency and time offsets can only be estimated when all instants $t_{ui}$, $\phi_{ui}$, $t_{di}$, and $\phi_{di}$ are known. It is emphasized again that for these instants, the measured send and receive instants at both intermediary points 10 and 30 for the upward and downward directions of several test cells are being dealt with. The measured instants are represented as pairs of values $(t_{ui}, \phi_{ui}-t_{ui})$ and $(t_{di}, \phi_{di}-t_{di})$ in the $(t, \phi-t)$ plane, as shown in FIG. 3. Using these pairs of values and a linear regression analysis, the frequency and time offsets of clock 40 in relation to clock 20 can be estimated. The instants obtained through measurements are adjusted to a straight line $\Delta T_0 + \alpha t$ according to the least squares method (see FIG. 3). For example, if the send and receive instants of n test cells are measured and recorded for the upward and downward directions, 2*n pairs of values are obtained, and the estimated value $\overline{\alpha}$ of the frequency offset is expressed by $$\overline{\alpha} = \frac{\frac{1}{2n}\left(\sum_{i=1}^{n} t_{ui}(\phi_{ui}-t_{ui}) + \sum_{i=1}^{n} t_{di}(\phi_{di}-t_{di})\right) - \overline{t}\cdot\overline{\phi-t}}{\frac{1}{2n}\left(\sum_{i=1}^{n} t_{ui}^2 + \sum_{i=1}^{n} t_{di}^2\right) - \overline{t}^2}$$

where $$\overline{t} = \frac{1}{2n}\left(\sum_{i=1}^{n} t_{ui} + \sum_{i=1}^{n} t_{di}\right)$$

and $$\overline{\phi-t} = \frac{1}{2n}\left(\sum_{i=1}^{n} (\phi_{ui}-t_{ui}) + \sum_{i=1}^{n} (\phi_{di}-t_{di})\right)$$

With the aforementioned linear regression analysis, an estimated value can also be calculated for time offset $\Delta T_0$ from all the send and receive instants, as well as the estimated frequency offset according to the equation $\Delta T_0 = \overline{\phi-t} - \overline{\alpha t}$. This estimated value, however, only agrees with the actual value when the propagation times of the cells in the upward and downward directions are the same on the average. A better estimated value for the time offset is obtained when the minimum propagation time of at least one cell transmitted between intermediary points 10 and 30 is determined from the measured send and receive instants.

The minimum propagation time of a cell between intermediary points 10 and 30 is determined by the physical transmission devices that are the same for both cell propagation directions. If a plurality of test cells are sent, some will have a propagation time that is equal to or almost equal to the minimum propagation time. The values for the minimum propagation times are then expressed by $$\text{Min}\left\{\frac{\phi_{ui}}{1+\overline{\alpha}} - t_{ui}\right\}, \text{Max}\left\{\frac{\phi_{di}}{1+\overline{\alpha}} - t_{di}\right\}$$

It is assumed that m values for m minimum propagation times were obtained. Then the following equation applies to the time offset:

$$\Delta \overline{T}_0 = (1+\overline{\alpha})\frac{1}{2}\left(\frac{1}{m}\sum_{j=1}^{m}\frac{\phi_{uj}}{1+\overline{\alpha}} - t_{uj} + \frac{1}{m}\sum_{j=1}^{m}\frac{\phi_{dj}}{1+\overline{\alpha}} - t_{dj}\right)$$

In principle two values are sufficient for determining the time offset, i.e., m=1 as long as these values exactly correspond to the minimum propagation time. In general, however, m>1 is selected, so that small deviations from the minimum propagation time are compensated for.

With the estimated values of the time and frequency offsets of clock 40 at intermediary point 30 in relation to clock 20 at intermediary point 10 obtained in this manner, values for the cell propagation times for a cell traveling in the upward and downward directions between the two intermediary points 10 and 30 are:

$$\overline{D}_{ui} = \frac{\phi_{ui} - \Delta \overline{T}_0}{1+\overline{\alpha}} - t_{ui}$$

and $$\overline{D}_{di} = t_{di} - \frac{\phi_{di} - \Delta \overline{T}_0}{1+\overline{\alpha}}$$

respectively. A process allowing one to determine cell propagation times between two test points without the need to install synchronized clocks at the test points is explained. The process is based on a linear regression analysis with which the time and frequency offsets between the clocks at the two intermediary points 10 and 30 can be estimated.

For purposes of illustration in FIG. 1, the buffers 60, 90, storage units 70, 100, and analysis and computing unit 80 are shown schematically below the clocks 20, 40, but these elements of course may be located between the clocks 20, 40 in various combinations as well.

What is claimed is:

1. A method for determining a cell propagation time between a first and a second test point in an asynchronous network with a clock installed at each test point, the method comprising the steps of:

bidirectionally transmitting a plurality of cells between the first and the second test points, measuring a send instant $(t_{ui}, \phi_{di})$ of at least one cell (i) of said plurality of cells, the cell (i) outgoing from the first test point to the second test point, measuring a receive instant $(\phi_{ui}, t_{di})$ of the cell (i) incoming to the second test point, repeating the measuring of the send instant and the receive instant for each cell, estimating a frequency offset $(\overline{\alpha})$ between the clocks at the first and second test points as a function of the measured send and receive instants, estimating a time offset $(\Delta \overline{T}_0)$ between the clocks at the first and the second test points as a function of the estimated frequency offset and the send and receive instants of the cell (i), and determining the cell propagation time $(\overline{D}_{ui}, \overline{D}_{di})$ as a function of at least one of the estimated frequency offset, the estimated time offset and the measured send and receive instants of the cell (i).

2. The method for determining cell propagation time as recited in claim 1 wherein the frequency offset and the time offset are determined through a linear regression analysis of the measured send and receive instants using the least squares of errors method.

3. The method for determining cell propagation time as recited in claim 1 wherein the cell propagation times for a cell traveling in upward and downward directions between the first and second test points are determined through equation $$\overline{D}_{ui} = \frac{\phi_{ui} - \Delta \overline{T}_0}{1 + \overline{\alpha}} - t_{ui}$$

and $$\overline{D}_{di} = t_{di} - \frac{\phi_{di} - \Delta \overline{T}_0}{1 + \overline{\alpha}}$$

respectively, where $\overline{D}_{ui}$ is the cell propagation time for the cell (i) transmitted in the upward direction, $\overline{D}_{di}$ is the cell propagation time for the cell (i) transmitted in the downward direction, $t_{ui}$ is the send instant of the cell directed upward from the first test point, $\phi_{ui}$ is the receive instant of the cell directed upward at the second test point, $\phi_{di}$ is the send instant of the cell directed downward from the second test point, $t_{di}$ is the receive instant of a cell directed downward at the first test point, $\overline{\alpha}$ is the estimated frequency offset, and $\Delta \overline{T}_0$ is the estimated time offset.

4. The method for determining cell propagation time as recited in claim 1 further comprising the step of determining at least one value as a function of the measured send and receive instants assigned in pairs to the cell and as a function of the estimated frequency offset, with the determined at least one value corresponding to the minimum propagation time between the two test points.

5. The method for determining cell propagation time as recited in claim 4 wherein the at least one value of the minimum propagation time for the cell traveling in upward and downward directions is determined.

6. The method for determining cell propagation time as recited in claim 1 wherein the receive time is entered in the cells arriving at one test point and the cell is re-sent to the other test point without delay.

7. The method for determining cell propagation time as recited in claim 1 wherein one of the first and second test points is selected as a reference test point.

8. An asynchronous network having the capability of determining a cell propagation time between a first and second test point comprising:

a first clock and a second clock corresponding, respectively, to the first test point and the second test points, the first and second clocks for measuring the send and receive instants of cells exchanged between the first and second test points;

at least one buffer for intermediary storage of at least one of said cells;

at least one storage device for storing the measured send and receive instants; and an analysis and computing unit receiving an input from the storage device, the analysis and computing unit for obtaining a frequency offset and a time offset between the first and second clocks at the first and second test points as a function of the measured send and receive instants and for determining the cell propagation time in at least one of an upward direction and downward direction as a function of at least one of the frequency offset, the time offset, and the send and receive instants.

9. The asynchronous network as recited in claim 8 wherein the analysis and computing unit determines the cell propagation time in the upward and downward directions according to the equations $$\overline{D}_{ui} = \frac{\phi_{ui} - \Delta \overline{T}_0}{1 + \overline{\alpha}} - t_{ui}$$

and $$\overline{D}_{di} = t_{di} - \frac{\phi_{di} - \Delta \overline{T}_0}{1 + \overline{\alpha}}$$

respectively, where $\overline{D}_{ui}$ is the cell propagation time for a cell (i) transmitted in the upward direction, $\overline{D}_{di}$ is the cell propagation time for a cell (i) transmitted in the downward direction, $t_{ui}$ is the send instant of a cell directed upward from a first test point, $\phi_{ui}$ is the receive instant of the cell directed upward at a second test point, $\phi_{di}$ is the send instant of the cell directed downward from a second test point, $t_{di}$ is the receive instant of a cell directed downward at a first test point, $\overline{\alpha}$ is the estimated frequency offset, and $\Delta \overline{T}_0$ is the estimated time offset.

* * * * *